United States Patent
Feinauer et al.

(10) Patent No.: US 7,367,929 B2
(45) Date of Patent: May 6, 2008

(54) MACHINE TOOL AND METHOD FOR CUTTING MACHINING OF WORKPIECES

(75) Inventors: Achim Feinauer, Göppingen (DE); Pavel Blazek, Owen (DE)

(73) Assignee: STAMA Maschinenfabrik GmbH, Schlierbach (DE)

( * ) Notice: Subject to any disclaimer, the term of this patent is extended or adjusted under 35 U.S.C. 154(b) by 0 days.

(21) Appl. No.: 11/724,660

(22) Filed: Mar. 14, 2007

(65) Prior Publication Data
US 2007/0234541 A1    Oct. 11, 2007

(30) Foreign Application Priority Data
Mar. 14, 2006   (DE) .................. 10 2006 013 418

(51) Int. Cl.
*B23Q 3/157*    (2006.01)
*B23P 23/02*    (2006.01)

(52) U.S. Cl. .................... 483/15; 483/18; 483/23; 29/27 C; 409/168; 409/172

(58) Field of Classification Search ............... 29/27 C, 29/27 R, 563, 36; 483/14–15, 18, 23, 24–26; 82/129, 121, 120, 162, 164, 151, 150; 409/165, 409/168, 172, 159, 224
See application file for complete search history.

(56) References Cited

U.S. PATENT DOCUMENTS

| 4,457,193 | A | * | 7/1984 | Matthey ........................ 82/129 |
| 5,088,361 | A | * | 2/1992 | Kojima et al. ............... 29/27 R |
| 5,436,845 | A | * | 7/1995 | Takahashi ...................... 82/129 |
| 6,131,259 | A |   | 10/2000 | Stark et al. |
| 6,185,818 | B1 | * | 2/2001 | Ito et al. ....................... 29/889.7 |
| 6,640,677 | B2 | * | 11/2003 | Ueda et al. .................... 82/129 |
| 7,032,484 | B2 | * | 4/2006 | Kobayashi et al. ............ 82/129 |
| 2002/0006764 | A1 |   | 1/2002 | Hanisch et al. |
| 2002/0014139 | A1 | * | 2/2002 | Hirose et al. .................. 82/118 |
| 2002/0020258 | A1 |   | 2/2002 | Grossmann |
| 2002/0086628 | A1 | * | 7/2002 | Blazek ......................... 451/365 |
| 2004/0211301 | A1 | * | 10/2004 | Kobayashi et al. ............ 82/129 |

FOREIGN PATENT DOCUMENTS

DE           33 20 940          12/1984

(Continued)

OTHER PUBLICATIONS

European Search Report for Application No. 07004435.9, 6 pages, mailed Jul. 25, 2007.

*Primary Examiner*—Erica Cadugan
(74) *Attorney, Agent, or Firm*—Klarquist Sparkman, LLP

(57) ABSTRACT

A machine tool for the cutting machining of workpieces, in particular of metallic workpieces, has a first and a second tool spindle for receiving a first and a second machining tool, and it has a first and a second workpiece carrier for receiving a first workpiece and a second workpiece. The first tool spindle is movable relative to the first and to the second workpiece carrier in order to selectively machine the first or the second workpiece. Moreover, the first workpiece are movable relative to one another in order to transfer a workpiece from one workpiece carrier to the other workpiece carrier. The second tool spindle is movable relative to the second workpiece carrier in order to machine the second workpiece.

19 Claims, 3 Drawing Sheets

FOREIGN PATENT DOCUMENTS

| | | |
|---|---|---|
| DE | 196 35 258 | 2/1998 |
| DE | 100 29 967 | 1/2002 |
| DE | 101 17 984 | 6/2002 |
| DE | 203 01 126 | 4/2003 |
| EP | 1 004 397 A | 5/2000 |
| EP | 1 607 176 A | 12/2005 |
| GB | 2178991 A * | 2/1987 |
| WO | 89/11951 | 12/1989 |
| WO | 03/084711 | 10/2003 |

* cited by examiner

MACHINE TOOL AND METHOD FOR CUTTING MACHINING OF WORKPIECES

CROSS-REFERENCE TO RELATED APPLICATION

This application claims the benefit of German Patent Application No. DE 10 2006 013 418.4, filed Mar. 14, 2006, 2006, which is hereby incorporated by reference.

BACKGROUND

The present invention relates to a machine tool and a method for cutting machining of workpieces, and in particular for cutting machining of metallic workpieces.

DE 196 35 258 C1 discloses a machine tool having a tool spindle which is arranged on a travelling column. The tool spindle in this case points with its tool downwards and it can be moved in three spatial axes perpendicular to one another. Below the tool spindle, there is arranged a workpiece carrier in the form of a workpiece spindle. The workpiece spindle receives and holds rod-shaped workpieces, and it can be pivoted about a pivot axis, so that a workpiece rod can be brought both into a horizontal and into a vertical position. In addition, the workpiece rod can be rotated about its longitudinal axis, so that a 5-axis-machining of the workpiece rod is enabled. By means of this known machine tool, a plurality of workpieces can be produced from the rod. In a development, which, however, is mentioned only briefly in DE 196 35 258 C1, the known machine tool has a second workpiece carrier, by means of which a partly machined workpiece can be extracted from the workpiece spindle in order to allow a machining of what is known as the sixth side, that is to say that side of the workpiece which was formerly chucked in the first workpiece spindle.

DE 100 29 967 A1 discloses a machine tool for the machining of optical workpieces, which machine tool has two tool spindles arranged next to one another and two workpiece spindles arranged next to one another, wherein a tool spindle and a workpiece spindle in each case are located opposite one another in order machine workpieces. A direct transfer of a partly machined workpiece from one workpiece spindle to the other is neither provided nor possible. For 6-side machining, therefore, a partly machined workpiece has to be rechucked from one workpiece carrier onto the other workpiece carrier, and this may be detrimental to machining accuracy due to position errors during the rechucking operation.

Machine tools having a plurality of working spindles are known from DE 33 20 940 A1 and DE 203 01 126 U1. DE 33 20 940 A1 relates to a two-spindle lathe, the two working spindles (=workpiece spindles in this case) being arranged so as to be offset at 180° with respect to one another, in order to allow a transfer of a partly machined workpiece from one working spindle to the other. However, the known machine allows only lathe-turning machining of workpieces, that is to say it is limited in terms of machining flexibility and the complexity of the workpieces produced.

A machine tool disclosed by DE 203 01 126 U1 is designed for simultaneous machining of two identical workpieces in two parallel chucking fixtures. The transfer of a (partly machined) workpiece from one workpiece carrier to the other is neither provided nor possible. Accordingly, the machining accuracy of this known machine tool in the case of 6-side machining is limited.

SUMMARY

Against this background, described below are a machine tool and methods which allow for an accurate 6-side machining of complex workpieces with high machining flexibility and high productivity.

According to one aspect, there is provided a machine tool for cutting machining of workpieces, comprising a first tool spindle for receiving a first machining tool, a second tool spindle for receiving a second machining tool, a first workpiece carrier for receiving a first workpiece, and a second workpiece carrier for receiving a second workpiece, with the first tool spindle being movable relative to the first and relative to the second workpiece carrier in order to selectively machine the first or the second workpiece by means of the first machining tool, with the second tool spindle being movable relative to the second workpiece carrier in order to machine the second workpiece, and with the first and the second workpiece carriers being movable relative to one another in order to transfer a workpiece from one workpiece carrier to the other workpiece carrier.

According to another aspect, there is provided a method for cutting machining of workpieces, comprising the steps of chucking a first workpiece into a first workpiece carrier, chucking a first machining tool into a first tool spindle, machining the first workpiece in the first workpiece carrier by means of the first machining tool in order to produce a partly machined workpiece, transferring the partly machined workpiece from the first workpiece carrier to a second workpiece carrier, the second workpiece carrier being moved in relation to the first workpiece carrier in order to take over the partly machined workpiece, and machining the partly machined workpiece in the second workpiece carrier, wherein the partly machined workpiece is machined in the second workpiece carrier by means of a second machining tool chucked into a second tool spindle.

The novel machine tool and the method thus use (at least) two tool spindles in conjunction with two workpiece carriers. The tool spindles and workpiece carriers are preferably arranged, so that simultaneous 5-axes machining of two different workpieces is enabled. This allows for high productivity. Furthermore, the new arrangement of the tool spindles and workpiece carriers also allows for a highly flexible machining of workpieces and, in particular, high-precision six-side machining, because of the variable assignment of the second workpiece carrier, which can cooperate selectively with the first tool spindle or with the second tool spindle. For the method, it is particularly advantageous if the partly machined workpiece is machined in the second workpiece carrier by means of the second tool spindle, while at the same time a new (first) workpiece is machined by means of the first tool spindle and the first workpiece carrier.

Since the second workpiece carrier can cooperate with both tool spindles and additionally also with the first workpiece carrier, the second workpiece carrier assumes a double function. It functions, on the one hand, as a workpiece carrier which allows machining selectively by means of the first or the second tool spindle. Furthermore, it functions as a transport means in order to transport a workpiece partly machined by means of the first tool spindle to the second tool spindle. Since the partly machined workpiece is transported in the exactly defined machining position during this transport operation, high machining accuracy is ensured in spite of the change from the first to the second tool spindle.

Overall, the novel machine tool and novel method therefore make it possible to have a highly productive and high-precision machining of workpieces. Moreover, the novel machine concept allows relatively cost-effective implementation, as is explained further below with reference to preferred exemplary embodiments. Furthermore, the novel machine and the novel method make highly flexible machining of complex workpieces possible, with the result that production costs can be further reduced.

In a preferred refinement, at least one of the workpiece carriers has an axis of rotation about which a workpiece can be rotated, wherein the workpiece can be chucked into the workpiece carrier substantially coaxially with respect to the axis of rotation. Preferably, the first and the second workpiece carrier are designed in this way.

This measure makes it possible to minimize the movement travels of the first and second tool spindles, with the result that productivity can be further increased.

In a further preferred refinement, the at least one workpiece carrier is designed as a lathe-turn spindle, that is to say it is capable of rotating the workpiece about the axis of rotation with rotational speeds and torques which allow a cutting lathe-turning machining of metallic workpieces. In a particularly preferred embodiment, both workpiece carriers are designed as lathe-turn spindles, and it is preferable if the lathe-turn spindle or spindles are capable of rotating the workpieces at rotational speeds of at least 1000 revolutions per minute and with a torque of at least 100 Nm.

This refinement allows very flexible and variable machining of metallic workpieces. Since both lathe-turning machining and milling and drilling machining are possible via the tool spindles, moreover, highly complex workpieces can be produced with high precision and by the advantageous six-side machining.

In a further refinement, the first and the second workpiece carrier are movable in relation to one another in a plane parallel to the axis of rotation. In a particularly preferred embodiment, the first workpiece carrier is arranged fixedly, whilst the second workpiece carrier can be moved along a movement axis which lies parallel to the plane of the axis of rotation.

This refinement allows a simple and high-precision transfer of a partly machined first workpiece from the first workpiece carrier to the second workpiece carrier. Moreover, in the preferred refinement, the second workpiece carrier requires only one movement axis in order to move to and fro between a transfer position and a machining position. The preferred refinement is therefore also a cost-effective implementation.

In a further refinement, the at least one workpiece carrier has a pivot axis which runs perpendicularly with respect to the axis of rotation. Preferably, both workpiece carriers have such a pivot and rotational axis.

These refinements increase flexibility in the machining of workpieces even further, because they allow a 5-axes machining of workpieces. Complex workpieces can be machined even more quickly and more accurately in one chucking fixture.

In a further refinement, the novel machine tool has a first and a second base frame, the first tool spindle being arranged on the first base frame, whilst the second tool spindle is arranged on the second base frame. Preferably, each base frame is anchored separately on the ground or elsewhere.

This refinement reduces vibrations, oscillations and other mechanical couplings which could adversely influence the machining of workpieces by means of the two tool spindles. This refinement therefore contributes particularly advantageously to high machining accuracy.

In a further refinement, the first and the second base frame are separated from one another. In a preferred embodiment, the base frames are spaced apart from one another at a distance in the range between 0.05 and 1 mm. Furthermore, it is preferable if a seal, for example in the form of a sealing cord, is arranged between the two base frames, in order to prevent the penetration of moisture, coolant or chips.

This refinement ensures an even better decoupling (mechanical or dynamic and even thermal) of the two machine parts or working regions of the novel machine tool and, consequently, even higher accuracy in the simultaneous machining of first and second workpieces.

In a further refinement, the base frames have a common housing. In an exemplary embodiment, for the better decoupling of the two working regions, this involves two separate housings which are coupled to one another via a labyrinth structure.

This refinement simplifies the transfer and transport of a partly machined first workpiece into the working region of the second tool spindle. Moreover, due to the use of a common housing, the production costs of the novel machine tool can be reduced.

In a further refinement, the second workpiece carrier has a slide guide which is fastened to one of the base frames and which projects into the other base frame in the manner of a balcony.

This preferred refinement allows a further decoupling of the two tool spindles, whilst, furthermore, the second workpiece carrier can be used as an advantageous transport means for a partly machined workpiece.

In a further refinement, the first and the second base frame have a first and a second slide guide for the second workpiece carrier, the first and the second slide guide adjoining one another. In a further refinement, between the first and the second slide guide a gap remains, over which the second workpiece carrier can travel when it changes to and fro between the two working regions/machine parts. In a preferred embodiment, the gap is of an order of magnitude of about 0.05 to 1 mm.

This refinement, too, allows a further decoupling of the two tool spindles from one another, whilst the second workpiece carrier can nevertheless be moved from one tool spindle to the other tool spindle. Any offset of the two slide guides in relation to one another is negligible in terms of machining accuracy of the workpieces, because what is important for machining accuracy is only the defined position of the workpiece carrier in relation to the tool spindle by means of which the workpiece chucked in the workpiece carrier is machined. As compared with a balcony-like implementation of the slide guide, this refinement has the advantage that the slide guides can be supported, free of stress, over the entire range of movement, so that a flexion of the slide guides is avoided.

In a further refinement, the first and the second tool spindle are arranged next to one another in parallel, so that they form a spindle row, the second workpiece carrier being movable along a movement axis which runs essentially parallel with respect to the spindle row.

This refinement allows a particularly efficient machining of complex workpieces in continuous operation, the second workpiece carrier requiring only one translational movement axis. This refinement therefore contributes to a cost-effective implementation of the novel machine tool.

In a further refinement, the first tool spindle is movable along three movement axes, whilst the second tool spindle is movable only along two movement axes.

This refinement is preferred because the production costs for the novel machine tool can be reduced by one movement axis being waived in the case of the second tool spindle. The "missing" movement axis of the second tool spindle can be replaced cost-effectively by the translational movement axis of the second workpiece carrier.

In a further refinement, the novel machine tool comprises a common control unit for the first and the second tool spindle. It is likewise preferred if the common control unit also controls the two workpiece carriers, insofar as these are designed as tool spindles or to be movable in another way. Furthermore, the coolant system, the hydraulic system and/or further peripheral units are also preferably common to both tool spindles and/or workpiece carriers.

These refinements make it possible to have a further reduction in the production costs of the novel machine tool, without flexibility and productivity resulting from the new machine concept being impaired.

In a further preferred refinement, each tool spindle has an associated tool magazine.

This refinement makes it possible for workpieces to be machined in the two working regions of the novel machine tool simultaneously and completely independently of one another. Each tool magazine may be equipped with a complete tool set and can be controlled independently of the other tool magazine. By virtue of this refinement, productivity can be doubled, as compared with the machine mentioned in the introduction, if this is desired for a manufacturing task. On the other hand, the novel machine tool in this refinement benefits from the high manufacturing flexibility of the basic idea explained above.

It will be appreciated that the features mentioned above and those yet to be explained below may be used not only in the combination specified in each case, but also in other combinations or alone.

BRIEF DESCRIPTION OF THE DRAWINGS

Exemplary embodiments of the invention are illustrated in the drawing and explained in more detail in the following description. In the drawing.

DESCRIPTION OF PREFERRED EMBODIMENTS

Figure 1:
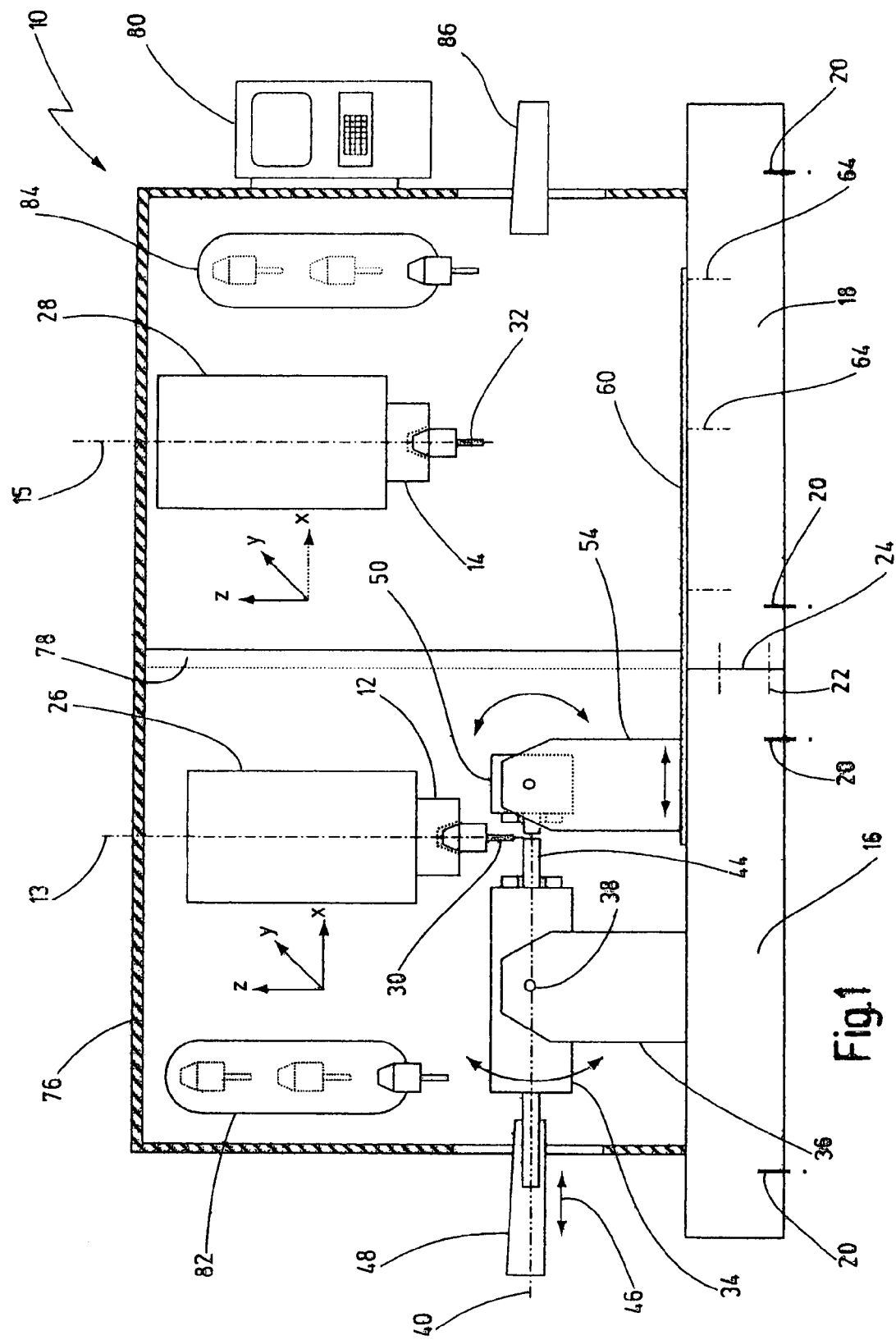
FIG. 1 shows a preferred embodiment of the novel machine tool in a simplified, partially sectional illustration.
Figure 2:
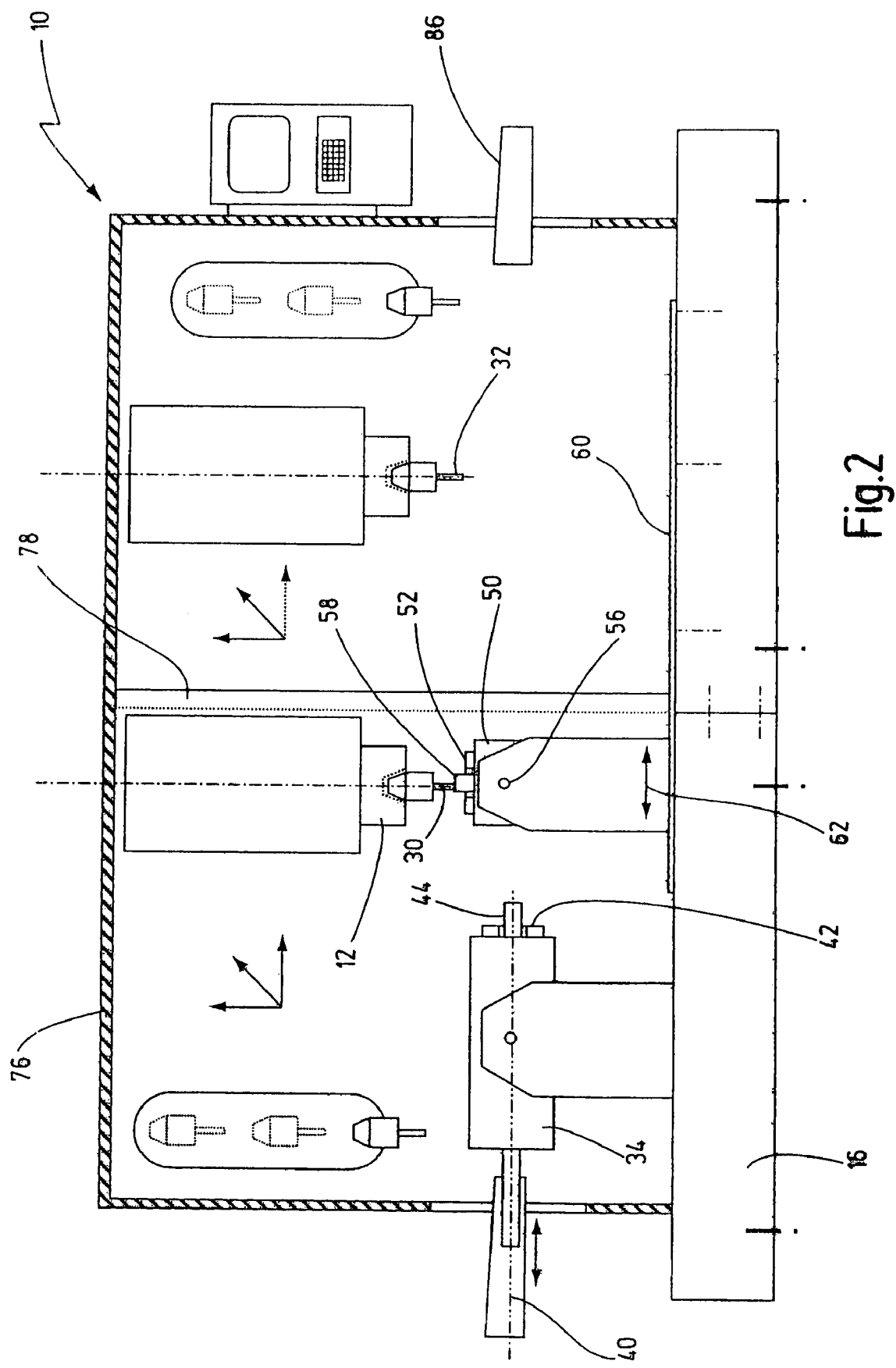
FIG. 2 shows the machine tool from FIG. 1 in an alternative operating position.

In FIGS. 1 and 2, an embodiment of the novel machine tool is designated in its entirety by reference numeral 10.

The machine tool 10 has a first tool spindle 12 and a second tool spindle 14. Both tool spindles are designed here as milling and drilling spindles for a cutting machining of metallic workpieces. The first tool spindle 12 is accordingly rotatable about an axis of rotation 13, and it is arranged movably on a first base frame 16. The second tool spindle 14 is rotatable about an axis of rotation 15, and it is arranged movably on the second base frame 18. The base frame 16, 18 are illustrated here as machine beds, such as are known per se from travelling-column machines. However, the invention is not restricted to travelling-column machines, that is to say it may also be used in machine tools in which the tool spindles 12, 14 are mounted on base frames in another way, for example in the case of machine tools of the gantry type of construction. Furthermore, the invention is not restricted to machine tools with vertical tool spindles. It may also be used in the case of machines with horizontal tool spindles and with correspondingly adapted movement axes.

Figure 3:
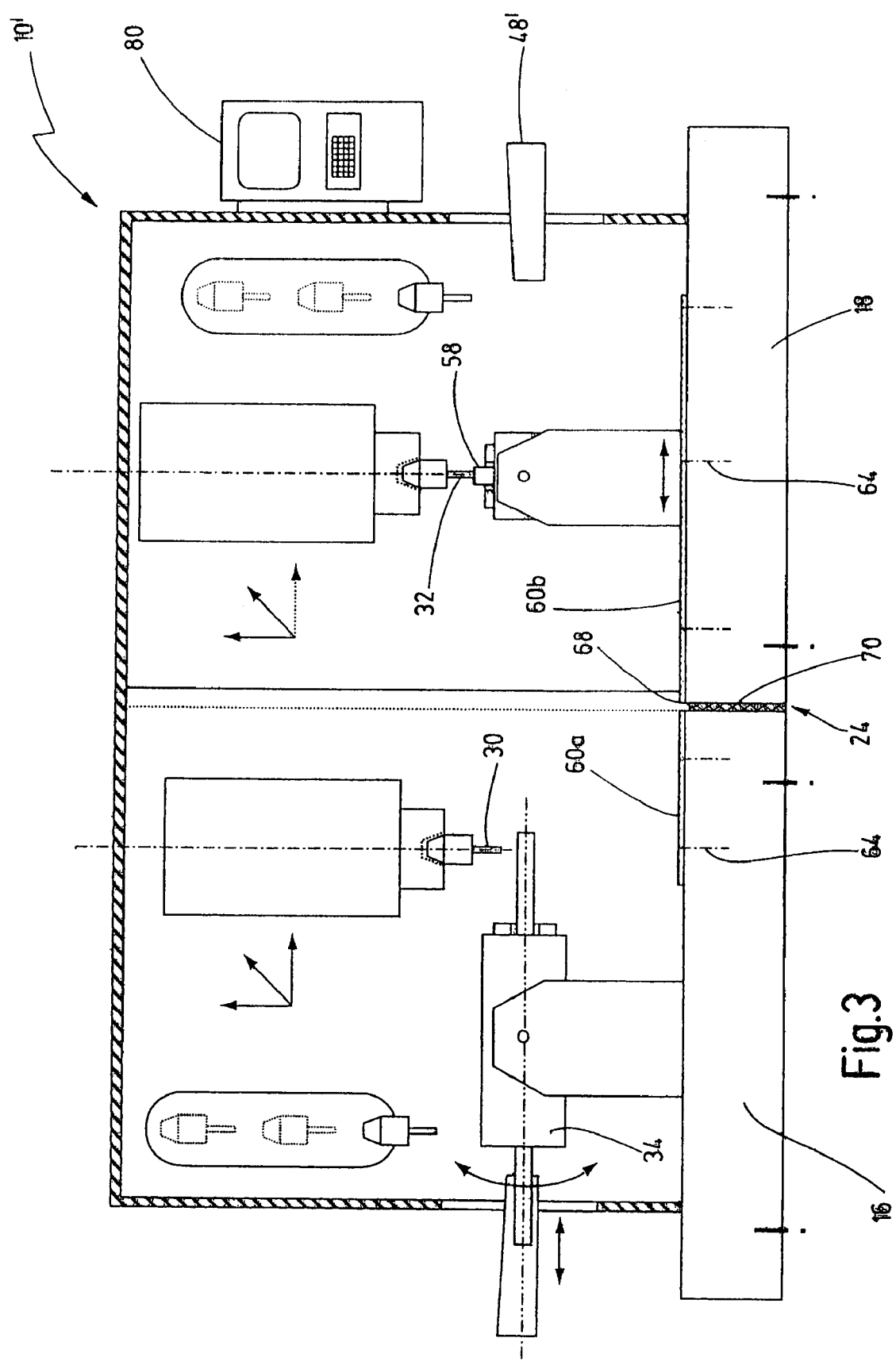
FIG. 3 shows a further embodiment of the novel machine tool in a further operating position.

In a preferred embodiment, the two base frames 16, 18 are designed separately from one another. Each base frame 16, 18 is anchored on the ground by means of screws 20. Furthermore, the base frames 16, 18 may be connected to one another in the region of their separating point 24 via screws 22. It is preferable, however, if the base frames 16, 18 are arranged next to one another without direct mechanical coupling, so that slight play remains. In an embodiment, the two base frames 16, 18 are set up separately from one another, so that a gap remains between them, which is, for example, of the order of magnitude of ¹/₁₀ mm (FIG. 3). A seal, for example in the form of a sealing cord (not illustrated separately here) is then preferably provided between the two base frames 16, 18. Alternatively to this, however, in other embodiments, the novel machine tool may also be implemented with a common base frame.

The tool spindle 12 is mounted here in a spindle box 26 which is movable along three spatial axes x, y, z in relation to one another. In a preferred embodiment, the spindle box 26 is arranged on a travelling column which is mounted in the x- and y-direction on the machine bed 16 via a cross slide (not illustrated here).

The tool spindle 14 is mounted in a second spindle box 26 which, in a preferred embodiment, is movable only in two spatial directions y and z. In alternative embodiments, however, the second tool spindle 14 may also be movable in three spatial directions in relation to one another, or the tool spindles are fixed in different spatial directions.

Each of the two tool spindles 12, 14 carries a machining tool 30, 32. Here, as is known from other machine tools, the machining tools 30, 32 are in each case chucked in what is known as a tool holder which is designed, for example, as an HSK tool holder. Typically, the machining tools are rotating machining tools here, such as milling heads, drilling needles or thread cutters. In a preferred embodiment, however, stationary machining tools, in particular lathe chisels, may be chucked into the tool spindles 12, 14, in order to allow lathe-turning machining on a rotating workpiece. Accordingly, the two workpiece spindles 12, 14 can be locked in preferred embodiments, so that they are capable of taking up the loads occurring during the lathe-turning of the workpieces.

Below the tool spindle 12, there is arranged a workpiece spindle 34. The workpiece spindle 34 is mounted in a bridge 36 pivotably about a pivot axis 38, as indicted diagrammatically by a double arrow in FIG. 1. The workpiece spindle 34 can accordingly be pivoted out of the horizontal position illustrated in FIG. 1 into a vertical position and into any desired intermediate positions.

The workpiece spindle 34 has a rotary drive, by means of which the workpiece spindle 34 can be rotated about its axis of rotation 40. In the preferred embodiment, the workpiece spindle 34 is designed as a lathe-turn spindle, that is to say it is capable of rotating a chucked workpiece at rotational speeds of, for example, up to 1500 revolutions per minute and with a torque of up to 150 Nm. Lathe-turning machining then takes place by means of a tool which is chucked into the tool spindle 12, the tool spindle 12 executing only translational movements during the lathe-turning machining.

At the front end (right end in FIG. 1), the tool spindle 34 has a clamping chuck 42 which may, for example, be a conventional three-jaw clamping chuck. By means of the clamping chuck 42, a workpiece 44 is chucked in the workpiece spindle 34. In preferred embodiments, the workpiece 44 is a workpiece rod which is pushed from the rear forwards through the workpiece spindle 34, as illustrated by means of the arrow 46. The workpiece rod 44 is supplied here via a workpiece supply device 48.

The machine tool 10, furthermore, has a second workpiece spindle 50 with a clamping chuck 52. The workpiece spindle 50 is mounted pivotably in a bridge 54, the pivot axis being designated by the reference numeral 56 (FIG. 2). The workpiece spindle 50 can therefore likewise be pivoted from a horizontal position (FIG. 1) into a vertical position (FIG. 2). Preferably, the workpiece spindle 50 can be pivoted out of the horizontal position shown in FIG. 1 by +/−90° upwards and downwards, a downward pivoting allowing a machining of a chucked workpiece 58 through the workpiece spindle 50, that is to say from the rear. Such a design of the workpiece spindle 50 is described in a parallel German patent application of the applicant having the official application number 10 2006 007 700.8, and it is particularly advantageous for the present machine tool. Due to the possibility of rotating and pivoting the workpieces in the two workpiece spindles, the novel machine tool allows for a parallel (simultaneous) but individual 5-axes machining of two different workpieces.

The bridge 54 is mounted on a slide guide 60, and it is coupled to a drive (not illustrated here), so that it is movable along the slide guide 60 in the direction of the double arrow 62 (FIG. 2). It is thereby possible to move the workpiece spindle 50 from a transfer position (FIG. 1) into a machining position (FIG. 2). In the transfer position, the workpiece spindle 50 can take over a partly machined (first) workpiece from the workpiece spindle 34. The partly machined workpiece is preferably the front end of the workpiece rod 44 which is separated from the rest of the workpiece rod after being chucked into the clamping chuck 52 of the workpiece spindle 50. Separation advantageously takes place by means of a tool, for example a saw, a cutting-off grinder or a milling cutter, which is chucked into the tool spindle 12.

In the machining position (FIG. 2) the workpiece 58 chucked in the workpiece spindle 50 can be machined by means of a machining tool 30 chucked in the tool spindle 12.

Furthermore, the slide guide 60 is designed such that the workpiece spindle 50 can be moved into a further machining position, in which the workpiece spindle 50 cooperates with the tool spindle 14 (FIG. 3). Accordingly, the workpiece spindle 50 functions here not only as a workpiece carrier which holds a workpiece during machining, but also as a transport means for transferring a workpiece out of the first machine part having the first tool spindle 12 into the second machine part having the second tool spindle 14.

In the embodiment illustrated in FIG. 1 and 2, the slide guide is fastened to the second base frame 18. This is illustrated in simplified form in FIG. 1 and 2 by means of screws 64. By contrast, the slide guide 60 is not fastened to the first base frame 16. It merely projects in the manner of a balcony into or over the first base frame 16.

In an alternative embodiment which is illustrated in FIG. 3, the slide guide 60 is designed in two parts, that is to say comprises a first slide guide 60a and a second slide guide 60b. The slide guide 60a is fastened to the first base frame 16 and the second slide guide 60b is fastened to the second base frame 18. The first and the second slide guide 60a, 60b adjoin one another in the region of the separating point 24 between the two base frames 16, 18. In a preferred embodiment, the two slide guides 60a, 60b are not connected rigidly to one another, that is to say a gap 68 may remain in the region of the separating point 24, although this gap is illustrated, greatly exaggerated, in FIG. 3. Moreover, in FIG. 3, a seal between the two base frames 16, 18 is illustrated, greatly exaggerated, at reference numeral 70.

In the preferred embodiments, the machine tool 10 has a common housing 76 which surrounds both the first working region having the first tool spindle 12 and the second working region having the second tool spindle 14. The housing 76 may also be designed in two parts, in which case a labyrinth structure is preferably provided in the region of the separating point, in order to connect the housing parts to one another such that relative movability and therefore decoupling are maintained. Such a labyrinth structure is illustrated in simplified form at reference numeral 78.

Even though the separate base frames 16, 18 and the tool spindles 12, 14 operating separately from one another mean, in principle, that there are two separate machine tools which are combined in a housing 76, in preferred embodiments a common control unit 80 is provided for both machine parts. Furthermore, in preferred embodiments, the coolant supply and the hydraulic system are common to both machine parts. By contrast, however, in the preferred embodiments each tool spindle 12, 14 has a specific tool magazine which is illustrated in simplified form at reference numerals 82, 84. The tool magazines 82, 84 may be designed, for example, as chain conveyors, into which a plurality of machining tools having corresponding toolholders are chucked.

At reference numeral 86, a workpiece extraction device is illustrated in simplified form (FIG. 1 and FIG. 2), at which a workpiece machined by means of the second tool spindle 14 can be extracted from the machine tool 10. Alternatively to this, the machine tool 10 may be equipped with a second workpiece supply device 48' in the region of the second tool spindle 14, so that the two machine parts having the tool spindles 12, 14 can operate completely separately from one another. In preferred embodiments of the novel method, however, it is intended to machine the workpieces in a continuous operation, that is to say a first workpiece 44 is first partly machined by means of the first tool spindle 12, is subsequently transferred by means of the workpiece spindle 50 to the second tool spindle 14 and is finished there. Furthermore, it is basically possible to completely machine a workpiece 44/58 solely by means of the first tool spindle 12.

However, continuous operation or, alternatively, parallel operation of the two machine parts is preferred. In the last-mentioned instance, it is preferable for the two machine parts to simultaneously produce identical workpieces.

In the embodiments in FIG. 1 to 3, a novel machine tool 10 for the machining of workpiece rods 44 is illustrated. The novel machine tool and the novel method may, however, also be used very well for the machining of cast or forged blanks, for example for the production of metal housings. Particularly in the preferred continuous-operational method, the novel machine tool and novel method have the advantage that the machined workpieces are held in a defined chucking fixture during the entire machining, with the result that high-precision six-side machining is achieved.

Furthermore, the preferred embodiments of the novel machine tool are illustrated with lathe-turn spindles 34, 50 as workpiece carriers. Alternatively to this, in other embodiments, the workpiece carriers may be designed as simple circular shafts (turntables) or even as largely rigid workpiece carriers.

What is claimed is:

1. A machine tool for cutting machining of workpieces, comprising a first tool spindle for receiving a first machining tool, a second tool spindle for receiving a second machining tool, a first workpiece carrier for receiving a first workpiece, and a second workpiece carrier for receiving a second workpiece, with the first tool spindle being movable relative to the first workpiece carrier and relative to the second workpiece carrier in order to selectively machine the first workpiece or the second workpiece with the first machining tool, with the second tool spindle being movable relative to the second workpiece carrier in order to machine the second workpiece, and with the first and the second workpiece carriers being movable relative to one another via pivoting of at least one of the workpiece carriers about an axis that is substantially perpendicular to a rotation axis of a workpiece held by at least one of the workpiece carriers, in order to transfer a workpiece from one workpiece carrier to the other workpiece carrier.

2. The machine tool of claim 1, wherein at least one of the workpiece carriers is configured to rotate the workpiece about the axis of rotation.

3. The machine tool of claim 2, wherein the at least one rotary workpiece carrier has a chuck for chucking the workpiece substantially coaxially with respect to the axis of rotation.

4. The machine tool of claim 2, wherein the at least one rotary workpiece carrier is designed as a lathe-turn spindle.

5. The machine tool of claim 2, wherein the first and the second workpiece carriers are movable relative to one another in a plane parallel to the axis of rotation.

6. The machine tool of claim 2, wherein the first and the second workpiece carriers are both configured to pivot a workpiece about respective pivot axes which run perpendicularly with respect to axes of rotation of workpieces received by the first and second workpieces carriers.

7. The machine tool of claim 1, further comprising a first base frame and a second base frame, the first tool spindle being arranged on the first base frame, and the second tool spindle being arranged on the second base frame.

8. The machine tool of claim 7, wherein the first and the second base frames are separated from one another.

9. The machine tool of claim 7, wherein the first and the second base frames have a common housing.

10. The machine tool of claim 7, wherein the second workpiece carrier has a slide guide which is fastened to one of the base frames and which projects onto the other base frame in the manner of a balcony.

11. The machine tool of claim 7, further comprising a first slide guide and a second slide guide for guiding the second workpiece carrier, with the first slide guide being arranged on the first base frame, with the second slide guide being arranged on the second base frame, and with the first and the second slide guides adjoining one another.

12. The machine tool of claim 1, wherein the first tool spindle and the second tool spindle are arranged next to one another in parallel, so that they form a spindle row, with the second workpiece carrier being movable along a movement axis which runs essentially parallel with respect to the spindle row.

13. The machine tool of claim 1, wherein the first tool spindle is movable along three movement axes, whilst the second tool spindle is movable along only two movement axes.

14. The machine tool of claim 1, further comprising a common control unit for controlling both the first and the second tool spindle.

15. The machine tool of claim 14, wherein the control unit is also configured to control the first and the second workpiece carrier.

16. The machine tool of claim 1, further comprising a workpiece supply device and a workpiece extraction device, the workpiece supply device cooperating with the first workpiece carrier and the workpiece extraction device cooperating with the second workpiece carrier.

17. The machine tool of claim 1, further comprising a first workpiece supply device and a second workpiece supply device, the first workpiece supply device cooperating with the first workpiece carrier and the second workpiece supply device cooperating with the second workpiece carrier.

18. The machine tool of claim 1, further comprising a first tool magazine and a second tool magazine, the first tool magazine cooperating with the first tool spindle and the second tool magazine cooperating with the second tool spindle.

19. A method for cutting machining of workpieces, comprising the steps of chucking a first workpiece into a first workpiece carrier, chucking a first machining tool into a first tool spindle, machining the first workpiece in the first workpiece carrier with the first machining tool in order to produce a partly machined workpiece, transferring the partly machined workpiece from the first workpiece carrier to a second workpiece carrier by pivoting at least one of the first and second workpiece carriers about an axis that is substantially perpendicular to a rotation axis of the partly machined workpiece when rotated by at least one of the first and second workpiece carriers, the second workpiece carrier being moved in relation to the first workpiece carrier in order to take over the partly machined workpiece, and machining the partly machined workpiece in the second workpiece carrier, wherein the partly machined workpiece is machined in the second workpiece carrier with a second machining tool chucked into a second tool spindle.

* * * * *